United States Patent
Iacob

(10) Patent No.: US 11,527,348 B1
(45) Date of Patent: Dec. 13, 2022

(54) GROUNDED FERRITE IN WIRELESS POWER SYSTEMS

(71) Applicant: Apple Inc., Cupertino, CA (US)

(72) Inventor: Alin Theodor Iacob, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 16/593,139

(22) Filed: Oct. 4, 2019

Related U.S. Application Data

(60) Provisional application No. 62/783,577, filed on Dec. 21, 2018.

(51) Int. Cl.
*H02J 7/00* (2006.01)
*H01F 27/24* (2006.01)
*H01F 38/14* (2006.01)
*H02J 7/02* (2016.01)
*H01F 27/36* (2006.01)
*H01F 27/28* (2006.01)

(52) U.S. Cl.
CPC ......... *H01F 27/24* (2013.01); *H01F 27/2885* (2013.01); *H01F 27/36* (2013.01); *H01F 38/14* (2013.01); *H02J 7/025* (2013.01)

(58) Field of Classification Search
USPC .......................... 320/106, 107, 108, 109, 112
See application file for complete search history.

(56) References Cited

U.S. PATENT DOCUMENTS

| | | | | |
|---|---|---|---|---|
| 2007/0029965 A1* | 2/2007 | Hui | ......................... | H02J 50/40 320/112 |
| 2009/0021212 A1* | 1/2009 | Hasegawa | ............... | H01F 38/14 320/108 |
| 2009/0121677 A1* | 5/2009 | Inoue | ................... | H02J 7/00302 320/108 |
| 2016/0172894 A1* | 6/2016 | Khripkov | ................ | H02J 50/40 320/108 |

FOREIGN PATENT DOCUMENTS

| | | | | | |
|---|---|---|---|---|---|
| DE | 202012101236 U1 | * | 8/2012 | ............. | H02J 50/10 |
| EP | 2546999 A2 | * | 1/2013 | ............. | H02J 50/40 |
| EP | 2636338 A1 | * | 9/2013 | ............. | A47B 13/08 |
| JP | 5361558 B2 | * | 12/2013 | | |
| JP | 6012328 B2 | * | 10/2016 | ........... | G03G 9/1131 |
| KR | 20150072622 A | * | 6/2015 | | |

* cited by examiner

*Primary Examiner* — Brian Ngo
(74) *Attorney, Agent, or Firm* — Kilpatrick Townsend and Stockton, LLP

(57) ABSTRACT

Charging devices according to embodiments of the present technology may include a housing including an input configured to receive power from a power source and provide power to internal components of the charging device. The charging devices may include a ferrite. The ferrite may be coupled with electrical ground. The charging devices may also include a conductive coil seated in the ferrite. The conductive coil may be configured to generate an electromagnetic field from an AC signal.

20 Claims, 3 Drawing Sheets

GROUNDED FERRITE IN WIRELESS POWER SYSTEMS

CROSS-REFERENCE TO RELATED APPLICATIONS

This application claims the benefit of U.S. Provisional Patent Application No. 62/783,577, filed on Dec. 21, 2018, and which is hereby incorporated by reference in its entirety for all purposes.

TECHNICAL FIELD

The present technology relates to charging systems. More specifically, the present technology relates to wireless charging system configurations, components, and characteristics that include a grounded ferrite.

BACKGROUND

Wireless charging is being incorporated with a variety of devices. As electronic devices in which wireless charging components are housed reduce in size, the available space for materials may be limited, which may affect operational performance.

SUMMARY

Charging devices according to embodiments of the present technology may include a housing including an input configured to receive power from a power source and provide AC power to internal components of the charging device. The charging devices may include a ferrite. The ferrite may be coupled with electrical ground. The charging devices may also include a conductive coil seated in the ferrite. The conductive coil may be configured to generate an electromagnetic field from an AC signal.

In some embodiments, the ferrite may be characterized by an annular shape. The ferrite may define an annular channel in a first surface of the ferrite, and the conductive coil may be seated in the annular channel. The charging devices may also include an e-shield, and the conductive coil may be disposed between the e-shield and the ferrite. The e-shield may be characterized by a tail coupled with electrical ground. The e-shield may include an annular member coupled with an end of the tail distal to an end of the tail coupled with electrical ground. The annular member of the e-shield may be seated on the conductive coil. The e-shield may include at least one contact extending radially inward from an inner annular radius of the annular member of the e-shield. The at least one contact may be electrically coupled with the ferrite at a position on the ferrite radially inward of the annular channel defined in the first surface of the ferrite. The e-shield may include at least one contact extending radially outward from an outer annular radius of the annular member of the e-shield. The at least one contact may be electrically coupled with the ferrite at a position on a second surface of the ferrite opposite the first surface of the ferrite. The charging devices may also include a circuit board disposed within the housing. The tail of the e-shield may be electrically coupled with the circuit board to electrically ground the e-shield. The housing may be conductive, and the housing may be electrically grounded through a cable connected at the input. At least one conductive arm may extend from the housing and leverably engage the ferrite to ground the ferrite with the housing.

Some embodiments of the present technology may encompass electronic device chargers. The chargers may include a housing defining an internal volume. The housing may include a first surface shaped to receive an electronic device supporting wireless charging. The chargers may include a ferrite positioned proximate a second surface of the housing opposite the first surface of the housing. The ferrite may be characterized by an annular shape, and the ferrite may define an annular channel in a first surface of the ferrite. The ferrite may be coupled with electrical ground. The chargers may include a conductive coil positioned in the annular channel defined by the ferrite. In operation, the conductive coil may produce oscillating fields from an AC signal. The chargers may also include an e-shield positioned between the conductive coil and the second surface of the housing.

In some embodiments, the chargers may also include a conductive material positioned in electrical contact with a second surface of the ferrite opposite the first surface. The conductive material may be coupled with electrical ground. The conductive material may include a metallic foil or plate positioned against the second surface of the ferrite. The chargers may also include a magnet. A first surface of the magnet may be disposed proximate the second surface of the housing and may be configured to magnetically engage a magnet of the electronic device to be charged. The magnet may be positioned within a central aperture defined by the ferrite. The magnet may be coupled with electrical ground, and the ferrite may be electrically coupled with the magnet to electrically ground the ferrite. The chargers may also include a DC shield positioned proximate a second surface of the magnet opposite the first surface. The DC shield may be electrically grounded, and the ferrite may be electrically coupled with the DC shield to electrically ground the ferrite.

Some embodiments of the present technology may encompass electronic charging systems. The charging systems may include an electronic device including a first coil configured to receive wireless power. The charging systems may include a charger configured to couple with the electronic device. The charger may include a housing including an input configured to receive power from a power source and provide power to internal components of the charger. The charger may include a ferrite that may be or include iron oxide. The ferrite may be coupled with electrical ground. The charger may also include a second coil seated within a first surface of the ferrite. The second coil may be configured to generate an electromagnetic field from an AC signal. The ferrite may be configured to direct flux from the electromagnetic field towards an electronic device coupled with the charger.

In some embodiments, the charging systems may also include a first magnet positioned in the electronic device. The first coil may be disposed about the first magnet. The charging systems may also include a second magnet positioned in the charger and configured to magnetically engage the first magnet. The ferrite may be characterized by an annular shape, and the second magnet may be disposed in a central aperture defined by the ferrite. The ferrite may be coupled with electrical ground via at least one of the housing, an e-shield, or a circuit board disposed within the housing. The charging systems may also include a conductive material positioned in electrical contact with a second surface of the ferrite opposite the first surface. The conductive material may be coupled with electrical ground. The charging system may also include an e-shield. The second coil may be disposed between the e-shield and the ferrite. The e-shield may be characterized by a tail coupled with electrical ground. The e-shield may include an annular member coupled with an end of the tail distal to an end of the tail coupled with electrical ground. The annular member of the e-shield may be seated on the second coil. The e-shield may include at least one contact extending radially inward from an inner annular radius of the annular member of the e-shield. The at least one contact is electrically coupled with the ferrite at a position on the ferrite radially inward of a location where the second coil may be seated within the ferrite.

Such technology may provide numerous benefits over conventional technology. For example, the present systems may reduce variability and peak-to-peak voltage of electromagnetic emissions. Additionally, components of the present technology may improve touch screen sensitivity of devices being charged by reducing voltage noise from the charger. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
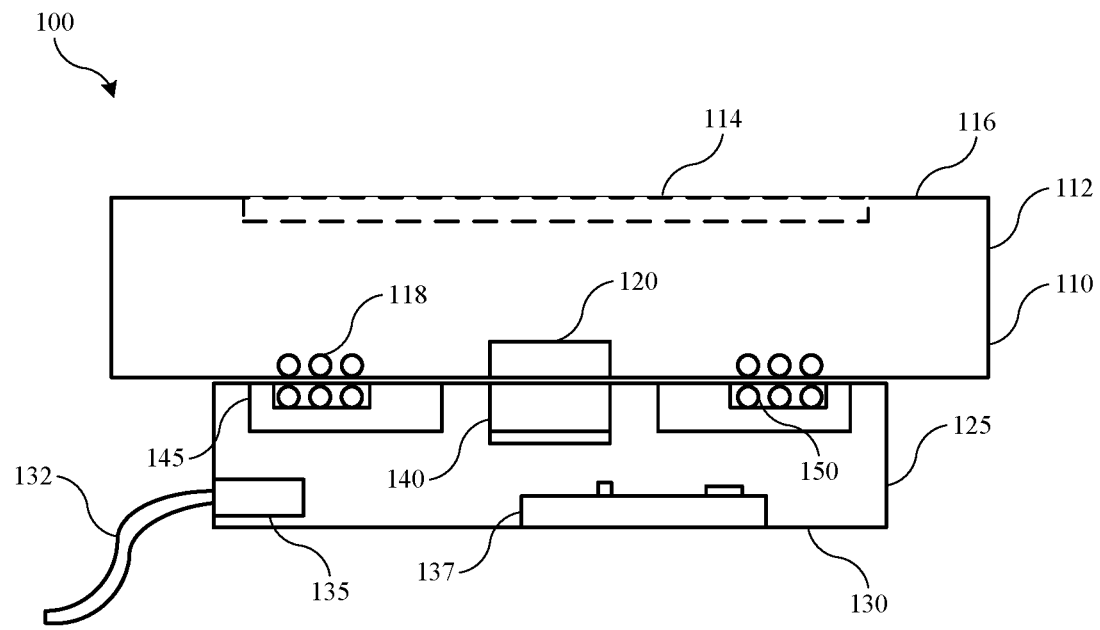
FIG. 1 shows a schematic cross-sectional view of an electronic charging system according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Wireless charging is a convenient feature for handheld products and smartphones. By incorporating charging coils in transmission and receiver devices, inductive charging can be performed, reducing certain inconveniences associated with wired charging. The process of wireless charging can have challenges including regulatory requirements regarding emissions, charging efficiency, and component interactions that affect operation, which can all impact performance. For example, during the charging process magnetic flux is emitted from both the transmission coil and the receiver coil. In many systems, ferrite is utilized to facilitate redirection of the flux to improve efficiency of distribution and collection. The ferrite provides this function by conducting the flux and directing it back towards the coil.

When some chargers are operating to charge electronic devices, an amount of feedback may be present due the generated oscillating fields. For example, a charging coil may radiate because it is operating with an AC signal. The produced AC signal may not be a pure sine wave, and this may affect voltage causing higher slew rates, which may in turn result in the coil radiating into several frequency domains. At higher frequencies or power transmission levels, these harmonics may introduce electromagnetic interference issues. Additionally, many newer devices, such as wearable devices, include a number of sensors that may exhibit high sensitivity. These sensors may also be sensitive to the signal being produced by the charger. For example, many touch screens are capacitive in nature and operate by a voltage drop produced at the position of the screen where a circuit may be completed via touch. However, during some charging operations, the oscillating voltage may interfere with touch interactions, and touch accuracy may be reduced.

To limit voltage injection into the electronic device being charged, some conventional systems incorporate an electrostatic shield or e-shield over the charging coil. The e-shield may be grounded, which may limit voltage transfer. An e-shield may not be incorporated to fully extend about the coil like a Faraday cage, as this may also block electromagnetic charging fields, and prevent charging. Accordingly, incorporation of an e-shield may assist in voltage transfer to facilitate regulatory emission passage rates, but may not sufficiently solve voltage production that interferes with operation during charging.

The present technology overcomes many of these issues by grounding the ferrite of the system. While many conventional technologies presume the ferrite to be non-conductive, in many devices conductive materials in ferrite may produce a semi-conductive mass, which in smaller scale devices may cause voltage effects. By grounding the ferrite in any number of ways, chassis voltage can be reduced, improving touch capability during charging operations. Additionally, peak-to-peak voltage used in regulatory emissions testing can be reduced by an order of magnitude for some devices, which may improve pass rates by overcoming manufacturing variability. As yet another benefit, the reduction in charger noise provided by grounding the ferrite may improve sensor and antenna operation, which may otherwise be saturated with noise during charging operations.

Although the remaining portions of the description will routinely reference a particular charging system and wearable device, it will be readily understood by the skilled artisan that the technology is not so limited. The present materials and technology may be employed with any number of electronic devices that may include a ferrite operating under an AC signal frequency, where the ferrite may be a relatively large mass relative to the coil or charging device. Accordingly, aspects of the present technology may be implemented in a host of charging devices as well as receiving devices, which may include, without limitation, phones and mobile devices, watches, glasses, and other wearable technology including fitness devices, handheld electronic devices, laptops, tablets, and other computers, as well as other devices that may benefit from the use of wireless charging technology. Thus, the present technology is not intended to be limited to any specific example provided for illustration.

FIG. 1 shows a schematic cross-sectional view of an electronic charging system 100 according to some embodiments of the present technology. It is to be understood that the system of FIG. 1 is merely exemplary of any system that may incorporate the present technology. Electronic charging system 100 may illustrate a number of devices, including a charger 125, which may include a mat, charging station, wireless rechargeable battery, personal computing device, or mobile device, for example. Additionally, electronic charging system 100 may include an electronic device 110, which may be a tablet computing device, wearable electronic device including a fitness device or watch, as well as a mobile communication device, such as a smartphone. Electronic device 110 may include an enclosure 112, or housing, that defines an internal cavity to receive several internal components, some of which will be described below, and which may include components such as a circuit board, processor circuit, memory circuit, charging coils, and an internal power supply, as non-limiting examples. The enclosure 112 may include a metal, such as aluminum or steel, or a metal alloy that includes two or more metals. Alternatively, the enclosure 112 may include a non-metal material or materials, such as ceramics, polymers, or other flexible materials including combinations of metal and non-metal materials.

The electronic device 110 may further include an active region 114 shown as a dotted line, although in some embodiments region 114 may be a coextensive portion of the enclosure 112. When present, active region 114 may include a charging surface, transfer surface, or a display surface designed to present visual information in the form of still images and/or video. The active region 114 may include a capacitive touch sensitive layer designed to receive a touch input to alter the visual information. Also, the electronic device 110 may include a protective cover 116 that overlays the active region 114, when present. The protective cover 116 may include a transparent material, such as glass or sapphire, as non-limiting examples, and may include EMF shielding materials, or other materials through which electronic transfer may occur.

The electronic device 110 may further include one or more buttons, dials, or crowns used as control input to a processor circuit, not shown. For example, buttons may depress in response to a force or a dial may be turned, pressed, or pulled, and these inputs may provide a control that alters the visual information presented by the active region 114. Additionally, although not shown, the electronic device 110 may include one or more buttons disposed along the enclosure 112 to provide one or more additional control inputs. Within the enclosure 112 may be a coil 118 that may be a power receiving coil, which may wirelessly receive power from charger 125. Coil 118 may be connected with components configured to convert received energy into AC or DC current, which may be used to power aspects of the electronic device or charge a battery contained within the electronic device. Some embodiments, or some electronic devices, may also include a magnet 120, which may be used to couple charger 125 with electronic device 110 for some charging systems and may facilitate alignment between the charger 105 and the electronic device 110. As illustrated, the coil 118 may extend about the magnet when included.

Charger 125 may include a number of components and configurations, and may be configured to accommodate a specific device, or may be generally able to provide charging capability to one or more devices. For example, although illustrated with a relatively planar surface, a top surface or first surface of charger 125 may be shaped to accommodate the shape of an electronic device, which may be curved in some configurations. Accordingly, charger 125 may be characterized by a number of non-planar geometries and configurations.

Charger 125 may include a housing 130, which may define an internal volume within the charger. Housing 130 may define an input, port, or access through which a power cable 132 may be coupled with internal components of the charger. The power cable 132 may be operable to connect to mains power or an auxiliary power source and deliver power to the components of charger 125. For example, among any number of internal components that may be included with a charger may be an internal power source 135, which may be configured to supply conditioned or shaped power, which in some embodiments may include distributing AC power to internal coils. Housing 130 may include a printed circuit board 137, which may have any number of processing components and memory, and may be configured to operate one or more aspects of the charger, modify or engage/disengage power delivery, or provide instructions to any internal or coupled components.

Charger 125 may optionally include a magnet 140 in some embodiments, which may be configured to engage or cooperate with magnet 120 of electronic device 110. Charger 125 may include a ferrite 145 positioned near a top surface of housing 130. As will be explained in detail below, ferrite 145 may be grounded within the charger 125 in one or more ways in some embodiments of the present technology. Additionally, charger 125 may include a conductive coil 150 that may be seated in the ferrite 145. The conductive coil may be operated or configured to generate an electromagnetic field from an AC signal. It is to be understood that either electronic device 110 or charger 125 may include a number of different or additional components common to chargers or electronic devices, and the description is intended merely to facilitate understanding of certain component configurations according to aspects of the present technology.

As noted previously, conventional systems may include a ferrite associated with a charging coil. An additional e-shield may be included to affect voltage transmission, but may not adequately reduce voltage production from the charger. Aspects of the present technology recognize that ferrite as incorporated within chargers may be contributing to voltage issues due to a semi-conductive nature of the ferrite. Ferrite as discussed in the present technology may refer to any iron-containing material implemented in a wireless charging system to direct flux. Some embodiments of the present technology may refer to ceramic versions of ferrite used in charging circuits, as opposed to iron core ferrites, such as may be used in some conventional power transformers. Accordingly, some embodiments of the present technology may refer to iron-oxide-based ferrite magnets or ferrite cores, which are conventionally considered non-conductive. Because iron oxide is ceramic, ferrites are often described as non-conductive conventionally. However, the present technology incorporates a recognition that the ferrites may be non-negligibly conductive, which may contribute to voltage noise in the charging system.

As electronic devices and chargers reduce in size, charging coils may be relatively small in scale and incorporated in relatively small housings. A ceramic ferrite incorporated within the housing for use with the coil as previously described may be a relatively larger mass within the device.

Ferrite ceramic generally covers transition metal oxides, and may cover iron oxides including additional metallic components including, but not limited to manganese, nickel, magnesium, or zinc. Because the material is oxide based, it is conventionally termed non-conductive. However, in the formation of ferrite, iron oxide is generally mixed with one or more other metals or oxides of these metals, and then sintered to produce the ferrite. Despite conventional considerations, testing has verified that the ferrite radiates during charging operations, identifying the semi-conductive nature. The sintered material incorporates ceramic iron oxide, which may contribute to the majority of the electrical characteristics of the ferrite, although minority conductive pathways may still be present with the metallic components. Because many e-shields cover the coil, but not the ferrite, the ferrite voltages may produce noise that may impact operations as previously described. Although the amount of voltage may be relatively minor, for more sensitive technology, such as of reduced scale, the voltages may impact not only regulation testing, but operations such as touch operations as previously explained.

Figure 2:
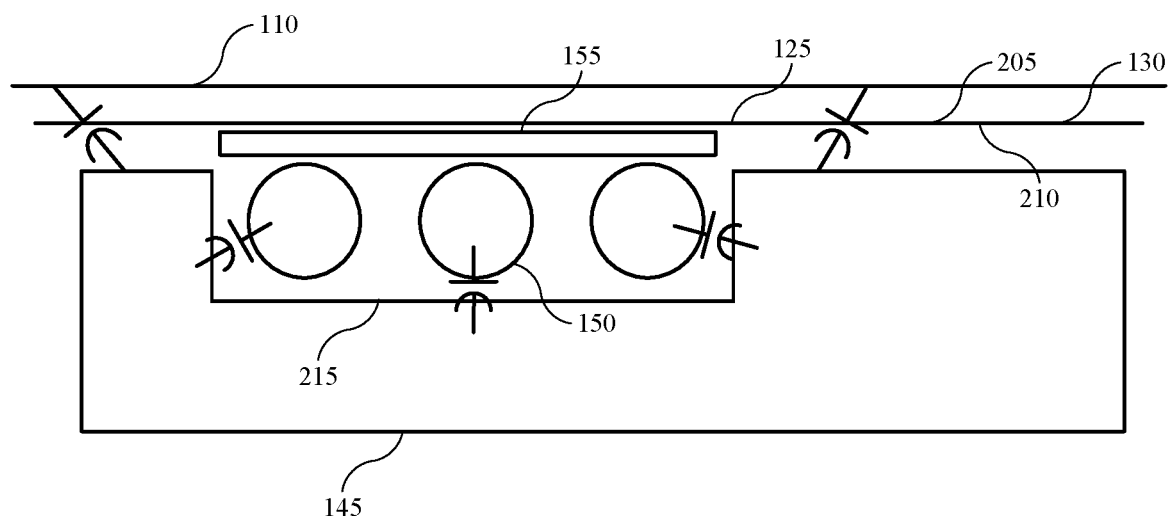
FIG. 2 shows a schematic cross-sectional view of a portion of an electronic charging system according to some embodiments of the present technology.

FIG. 2 shows a schematic cross-sectional view of a portion of an electronic charging system according to some embodiments of the present technology. Without intending to be bound by any particular theory, the figure may help illustrate effects within the charger. FIG. 2 may illustrate a partial view of a charging system including an electronic device 110 positioned to receive power from electromagnetic fields generated by a charger 125. FIG. 2 may illustrate a view of charging system 100, and may include any component or configurational aspect described above or throughout this disclosure. The section of charger 125 illustrated may include a portion of a coil 150 or solenoid seated within a ferrite 145. As illustrated in the figures, the charger 125 may include a first surface 205 of housing 130, which may engage electronic device 110. A second surface 210, may be an interior of the housing 130 opposite first surface 205, and may be the surface with which the ferrite and coil are proximate. Ferrite 145 may be characterized by an annular shape in some embodiments, as may be conductive coil 150. Although the coil may be seated on the ferrite in any number of ways, in some embodiments, the ferrite may define an annular channel 215 about a first surface of the ferrite, which is proximate the second surface of the housing. Conductive coil 150 may be seated within annular channel 215 in some embodiments, which may facilitate operation and improve efficiency of transfer.

Charger 125 may also include an e-shield 155 that may be disposed above the coil, or between the coil and the second surface 210 of housing 130, and conductive coil 150 may be positioned between ferrite 145 and e-shield 155. As noted above, e-shield 155 may be grounded within the charger, and thus may reduce voltage being otherwise transmitted as noise. However, e-shield 155 may not fully extend across ferrite 145, and manufacturing tolerances may cause variation in the e-shield location. In operation, coil 150 may radiate with an AC signal to produce an electromagnetic field that may transfer energy to a companion coil in electronic device 110. Because ferrite 145, which may be primarily a ceramic of iron oxide, may still be conductive as discussed above, the ferrite may cause parasitic capacitance with surrounding components, which may cause the ferrite 145 to radiate if not properly attenuated. Consequently, many conventional designs produce voltage noise from the ceramic ferrite.

As illustrated in FIG. 2, parasitic capacitance may occur between the coil and the ferrite, as well as between the ferrite and the chassis of the electronic device, which may cause the ferrite to radiate and produce noise that can impact electromagnetic compatibility testing as well as device operation. As explained above, a capacitive touch screen may identify touch location based on voltage drops. When ferrite 145 is generating voltage noise, touch screen sensing may be distorted. By grounding the ferrite according to embodiments of the present technology, chassis voltage from the charger may be significantly reduced. For example, in one non-limiting example, maximum peak-to-peak voltage was reduced both in magnitude by a factor of 10, as well as in variability, by grounding the ferrite compared to a similar device with an ungrounded ferrite. Because manufacturing tolerances may cause an amount of dislocation or variability between component locations, even a relatively small gap distance increase between an e-shield and a coil may affect produced noise. By grounding the ferrite, noise can be reduced significantly to improve regulation passage rates even with maintained manufacturing tolerances. Additionally, sensors of electronic devices being charged can more effectively operate with reduced noise that may otherwise overwhelm sensitive components.

Ferrites utilized in charging devices can be grounded in any number of ways, and the present technology is not intended to be limited to any particular grounding mechanism, which may be impacted by charger housing design, internal component configuration, or any number of other factors that may impact how the grounding may be performed. The following figures will describe a few possible grounding configurations among a number of other grounding mechanisms encompassed by the present technology. Accordingly, the technology of grounding a ceramic ferrite is not intended to be limited to any particular example discussed below, and these and any other grounding configurations may be combined or modified to provide grounding of the ferrite.

Figure 3:
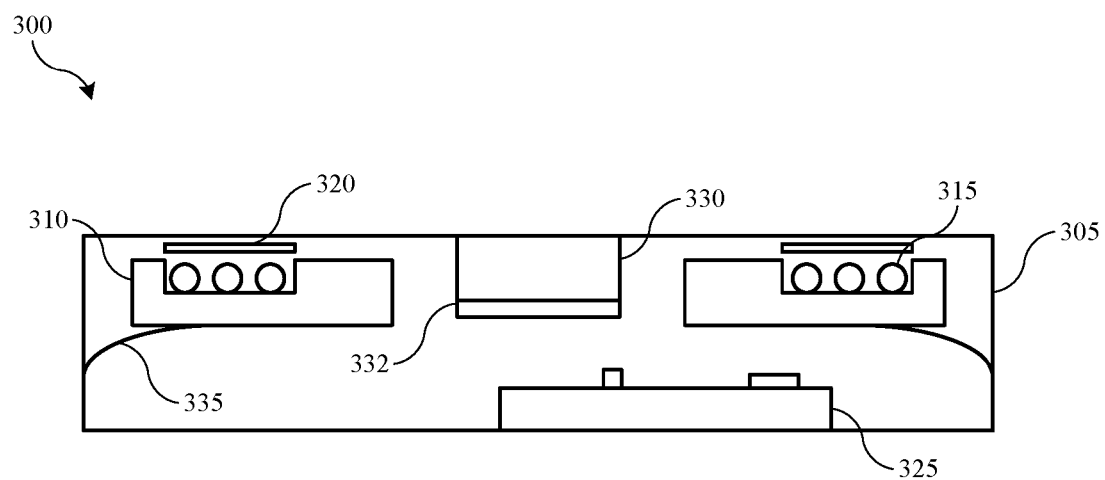
FIG. 3 shows a schematic cross-sectional view of a charging device according to some embodiments of the present technology.

FIG. 3 shows a schematic cross-sectional view of a charging device 300 according to some embodiments of the present technology. Charging device 300 may be similar to charger 125 discussed previously and may include any of the components described above. For example, charging device 300 may include a housing 305 within which a number of components may be housed. Internal components of the charging device may include a ferrite 310, a conductive coil 315, an e-shield 320, a circuit board 325, as well as a magnet 330 in some optional charging configurations.

Ferrite 310 may be grounded to one or more components within the charging device, which may be grounded through an input power line to the device as previously described. In some embodiments, housing 305 may include a metallic or other conductive material. Accordingly, in one exemplary embodiment, ferrite 310 may be grounded to the charging device housing 305. As illustrated, one or more conductive arms or extensions 335 may reach from a pivot position against an internal sidewall of the housing to a location within the internal volume of the housing. When the charging device is manufactured and closed, the extensions 335 may leverably engage the ferrite 310 in one or more locations about the charging device. In similar configurations, metallic or conductive springs may extend between the charging device housing and the ferrite to contact and ground the ferrite. In still other configurations, components including or similar to a leaf spring may be incorporated, which may be deformed in contact with the ferrite during device manufacturing to maintain contact in operation. Components may be included that may maintain an amount of tension against the ferrite to maintain contact over time, although other contact materials that may be in fixed contact with the ferrite may similarly be used. Accordingly, in some embodiments in which a conductive housing may be used, an extension may be connected between the housing and the ferrite to ground the ferrite.

Extensions may similarly be positioned between other grounded components and the ferrite to provide ferrite grounding according to some embodiments of the present technology. For example, in embodiments in which magnet 330 may be incorporated within the housing, the magnet may be included proximate the ferrite. For example, as illustrated and described elsewhere, ferrite 310 may be characterized by an annular shape, which may define a central aperture through the ferrite. Magnet 330 may be positioned within and extend through the central aperture in embodiments, and may be coupled with electrical ground in some instances. The ferrite 310 may be electrically coupled with the magnet in any way to electrically ground the ferrite as well. In this way, the ferrite may be coupled via one or more other components to ground in addition to one or more direct connections to ground. For example, the magnet may include a DC shield 332 positioned against a second surface of the magnet opposite a first surface of the magnet proximate a surface of the housing where an electronic device may be engaged for charging. The DC shield 332 may be a conductive material, which may be coupled with ground in one or more ways, to provide a ground path by which the ferrite may be grounded. Conductive adhesive, tape, or other materials may be incorporated to electrically join these components in any of these examples.

Figure 4A:
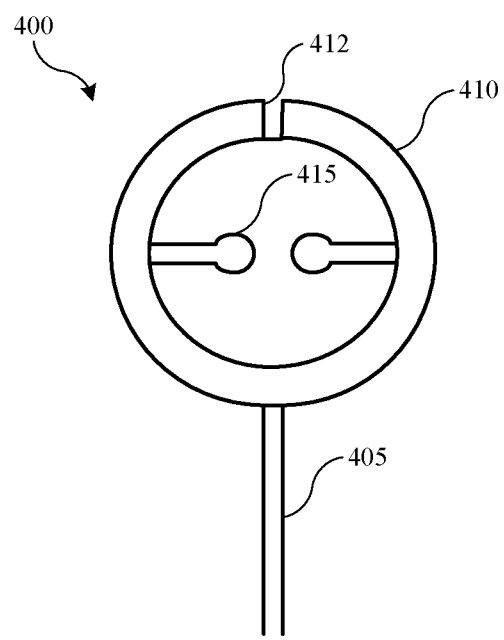
FIGS. 4A-4B show schematic views of e-shields according to some embodiments of the present technology.
Figure 4B:
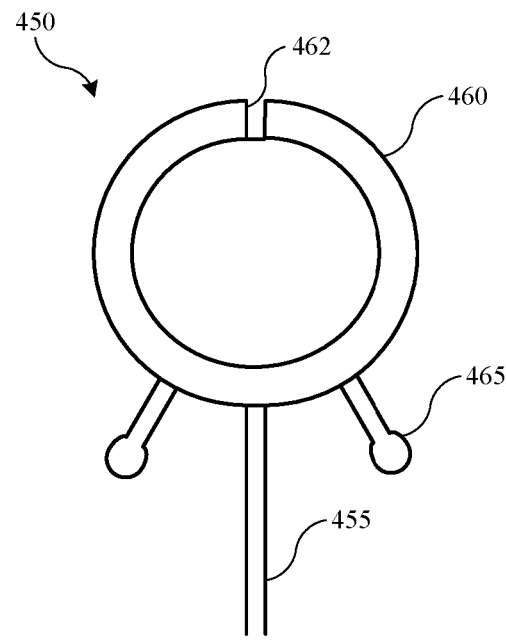

FIGS. 4A-4B show schematic views of e-shields according to some embodiments of the present technology, which may be adapted to couple the ferrite to ground. As previously noted, an e-shield may be included that is grounded in one or more ways. For example, the e-shield may be grounded by connecting it to a circuit board including a ground path, although the e-shield may similarly be connected to any other grounded component. FIG. 4A illustrates an embodiment in which an e-shield may include internal contacts, and FIG. 4B illustrates an embodiment in which an e-shield may include external contacts, either, any, or all of which may be coupled with the ferrite to provide a ground path to ground the ferrite.

As illustrated in FIG. 4A, e-shield 400 may be characterized by multiple components, which may include a tail 405. Tail 405 may be connected with a circuit board or other component at a first end of the tail that may ground the e-shield. At a distal end of the tail 405 may be connected an annular member 410. Annular member 410 may be characterized by an inner annular radius and an outer annular radius configured to cover a coil as previously described, and the annular member 410 may also at least partially radially cover a portion of an annular ferrite within which the coil may be seated. Annular member 410 may be substantially annular in some embodiments as the member may define a gap 412 formed radially across or in some configuration through each annular member 410. Gap 412 may fully extend from an inner annular edge of the annular member 410 to an outer annular edge of the annular member, which may form a discontinuity about a circumference of the e-shield. Additionally, gap 412 may form a notch as illustrated, while at least a portion of the annular member 410 connects around the e-shield.

E-shield 400 may be a conductive material in some embodiments to allow blocking of electrical noise. However, such a conductor proximate a source coil may allow eddy currents to be induced on the e-shield 400 from developed magnetic fields from the underlying coils. If the shield member forms a complete circular shape, or forms a complete loop, the developed eddy currents may increasingly react back on the coil opposing the magnetic field and further reduce charging efficiency of the device. Accordingly, gap 412 may reduce or limit eddy current generation as well as the accompanying heat generation from the eddy currents. E-shield 400 may be any number of materials or combinations of materials, which may be or include silver, copper, aluminum, zinc, nickel, stainless steel, or any other material which may be used to reduce the electrical noise transmitted or formed within the charging device.

E-shield 400 may be seated on or proximate the conductive coil in the charger, and in some embodiments may be modified to additionally contact the ferrite to provide a ground path for the ferrite. As illustrated in FIG. 4A, the e-shield may include at least one contact 415 extending radially inward from the inner annular radius of the annular member 410 of the e-shield. Although illustrated with two contacts 415, exemplary e-shields may include one or more contacts 415, and may include any number of contacts, which may depend on a number of factors including relative size of the components. Contacts 415 may be any size or shape, and may be coupled with the ferrite at a position of the ferrite radially inward of the coil. For example, ferrite 145 described above defines channel 215 recessed from a surface of the ferrite, and within which the coil may be seated. An inner annular portion of the ferrite, radially inward of the channel 215, may be raised, and in embodiments may be proximate the location of the e-shield. Contacts 415 may be coupled with the ferrite about this area, and may be coupled with conductive adhesive, conductive tape, or any other materials that may provide and maintain electrical contact between the components.

FIG. 4B illustrates an additional embodiment of an e-shield 450, aspects of which may be used as an alternative to e-shield 400, or may be used in addition to the contact 415. E-shield 450 may be similar to e-shield 400, and may include similar materials and characteristics. For example, e-shield 450 may include tail 455 that may provide ground coupling for the e-shield at a first end of the tail. At a second end of the tail distal to the first end, an annular member 460 may be included, which may include a gap 462, which may be a discontinuity or notch formed in the annular member as explained above. E-shield 450 may also include contacts 465, which may extend radially outward from an outer annular radius of the annular member 460. Contacts 465 may be similar to contacts 415, and may include any number and/or shape of contacts as discussed above. Contacts 465 may be coupled with the ferrite in a similar way as contacts 415, although contacts 465 may be coupled with the ferrite in a different location. For example, contacts 465 may connect with the ferrite about an outer sidewall of the ferrite, or may be folded about the ferrite to couple along a second surface of the ferrite opposite a first surface where the channel may be defined or which may be proximate a conductive coil. In either configuration, or in any number of variations of these configurations, the e-shield may be electrically coupled with the ferrite to provide grounding of the ferrite.

Figure 5:
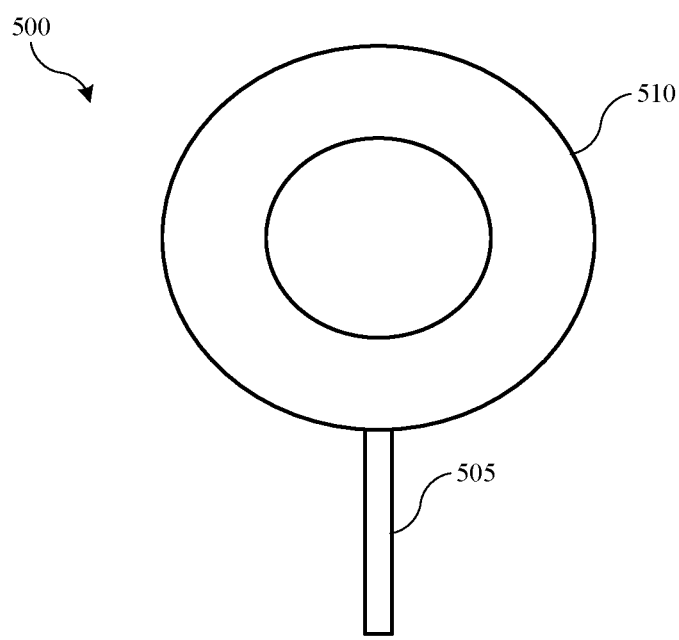
FIG. 5 shows a schematic view of a conductive material for grounding a ferrite according to some embodiments of the present technology.

FIG. 5 shows a schematic view of a conductive material 500 for grounding a ferrite according to some embodiments of the present technology. Material 500 may be used with any other grounding described above, and may illustrate a material characterized by an annular shape similar to the ferrite in one or more ways. Material 500 may be coupled with the ferrite along the second surface of the ferrite opposite a first surface proximate the coil and/or in which a channel may be defined to seat the coil. Similar to the e-shields described above, material 500 may include a tail 505 that can be coupled to any ground location within the charger, including any of the components or locations discussed previously. Material 500 may also include an annular member 510, which may be characterized by a similar inner annular radius as the ferrite with which it may be coupled, which may provide access for components disposed within the aperture defined by the ferrite. Annular member 510 may be characterized by any outer annular radius which may be less than or equal to the outer annular radius of the ferrite. Because material 500 may operate to ground the ferrite, the amount of material may not need to fully cover the surface of the ferrite in some embodiments.

Material 500 may be any conductive material including any conductive material described above. Material 500, including either tail 505 and/or annular member 510, may be characterized by any thickness. For example, tail 505 may be characterized by a relatively thin film or foil to provide grounding. Annular member 510 may similarly be characterized by a thin film or foil, although annular member 510 may also be characterized by a thin plate, which may both provide support for the ferrite and provide an amount of weight for the charger in some embodiments. Annular member 510 may be coupled with the ferrite in any number of ways, which may include a conductive adhesive or tape, which may provide more complete electrical coupling, although a ferrite may be fitted against annular member 510, which may include a ridge or lip for press fitting or coupling the ferrite in some embodiments.

Utilizing any of the described or additional grounding means, a ferrite, such as a ceramic ferrite may be grounded within a charging system. By grounding the ferrite, chassis voltage within the device may be reduced. This reduction may provide a number of benefits including improved touch sensing during charging operations and reduced peak-to-peak voltage variability during charging operations. Additionally, antennas and other data delivery and reception components may operate more effectively during charging operations as voltage noise from a radiating ferrite may be attenuated, which may prevent this noise from saturating reception components.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "an extension" includes a plurality of such extensions, and reference to "the coil" includes reference to one or more coils and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A charging device comprising:
   a housing including an input configured to receive power from a power source;
   a ferrite defining a central aperture, wherein the ferrite is coupled with an electrical ground;
   a magnet disposed within the central aperture; and
   a conductive coil disposed in the ferrite, the conductive coil configured to generate an electromagnetic field from an AC signal formed using power received from the power source.

2. The charging device of claim 1, wherein the ferrite is characterized by an annular shape, wherein the ferrite defines an annular channel in a first surface of the ferrite, and wherein the conductive coil is disposed in the annular channel.

3. The charging device of claim 2, further comprising an e-shield, wherein the conductive coil is disposed between the e-shield and the ferrite.

4. The charging device of claim 3, wherein the e-shield is characterized by a tail coupled with electrical ground, wherein the e-shield comprises an annular member coupled with an end of the tail distal to an end of the tail coupled with electrical ground, and wherein the annular member of the e-shield is seated on the conductive coil.

5. The charging device of claim 4, wherein the e-shield comprises at least one contact extending radially inward from an inner annular radius of the annular member of the e-shield, wherein the at least one contact is electrically coupled with the ferrite at a position on the ferrite radially inward of the annular channel defined in the first surface of the ferrite.

6. The charging device of claim 4, wherein the e-shield comprises at least one contact extending radially outward from an outer annular radius of the annular member of the e-shield, wherein the at least one contact is electrically coupled with the ferrite at a position on a second surface of the ferrite opposite the first surface of the ferrite.

7. The charging device of claim 4, further comprising a circuit board disposed within the housing.

8. The charging device of claim 7, wherein the tail of the e-shield is electrically coupled with the circuit board to electrically ground the e-shield.

9. The charging device of claim 1, wherein the housing is conductive, and wherein the housing is electrically grounded through a cable connected at the input.

10. The charging device of claim 9, wherein at least one conductive arm extends from the housing and leverably engages the ferrite to ground the ferrite with the housing.

11. An electronic device charger comprising:
- a housing defining an internal volume, wherein the housing comprises a first surface shaped to receive an electronic device supporting wireless charging;
- a ferrite positioned proximate a second surface of the housing opposite the first surface of the housing, wherein the ferrite is characterized by an annular shape defining an aperture, wherein the ferrite defines an annular channel in a first surface of the ferrite, and wherein the ferrite is coupled with an electrical ground;
- a magnet disposed within the aperture;
- a conductive coil positioned in the annular channel defined by the ferrite, wherein in operation the conductive coil produces oscillating fields from an AC signal; and
- an e-shield positioned between the conductive coil and the second surface of the housing.

12. The electronic device charger of claim 11, further comprising a conductive material positioned in electrical contact with a second surface of the ferrite opposite the first surface, wherein the conductive material is coupled with electrical ground.

13. The electronic device charger of claim 12, wherein the conductive material comprises a metallic foil or plate positioned against the second surface of the ferrite.

14. The electronic device charger of claim 11, wherein a first surface of the magnet is disposed proximate the second surface of the housing and configured to magnetically engage a magnet of the electronic device to be charged, wherein the magnet is coupled with electrical ground, and wherein the ferrite is electrically coupled with the magnet to electrically ground the ferrite.

15. The electronic device charger of claim 14, further comprising a DC shield positioned proximate a second surface of the magnet opposite the first surface, wherein the DC shield is electrically grounded, and wherein the ferrite is electrically coupled with the DC shield to electrically ground the ferrite.

16. An electronic charging system comprising:
- an electronic device comprising a first coil configured to receive wireless power; and
- a charger configured to couple with the electronic device, the charger comprising:
  - a housing including an input configured to receive power from a power source and provide power to internal components of the charger;
  - a ferrite comprising iron oxide and defining an aperture, wherein the ferrite is coupled with electrical ground;
  - a magnet disposed within the aperture; and
  - a second coil seated within a first surface of the ferrite, the second coil configured to generate an electromagnetic field from an AC signal, wherein the ferrite is configured to direct flux from the electromagnetic field towards an electronic device coupled with the charger.

17. The electronic charging system of claim 16, wherein the first coil is disposed about the first magnet; and
a second magnet positioned in the charger and configured to magnetically engage the first magnet, wherein the ferrite is characterized by an annular shape.

18. The electronic charging system of claim 16, wherein the ferrite is coupled with electrical ground via at least one of the housing, an e-shield, or a circuit board disposed within the housing.

19. The electronic charging system of claim 16, further comprising a conductive material positioned in electrical contact with a second surface of the ferrite opposite the first surface, wherein the conductive material is coupled with electrical ground.

20. The electronic charging system of claim 16, further comprising an e-shield, wherein the second coil is disposed between the e-shield and the ferrite, wherein the e-shield is characterized by a tail coupled with electrical ground, wherein the e-shield comprises an annular member coupled with an end of the tail distal to an end of the tail coupled with electrical ground, wherein the annular member of the e-shield is seated on the second coil, wherein the e-shield comprises at least one contact extending radially inward from an inner annular radius of the annular member of the e-shield, wherein the at least one contact is electrically coupled with the ferrite at a position on the ferrite radially inward of a location where the second coil is seated within the ferrite.

* * * * *